Patented May 2, 1933

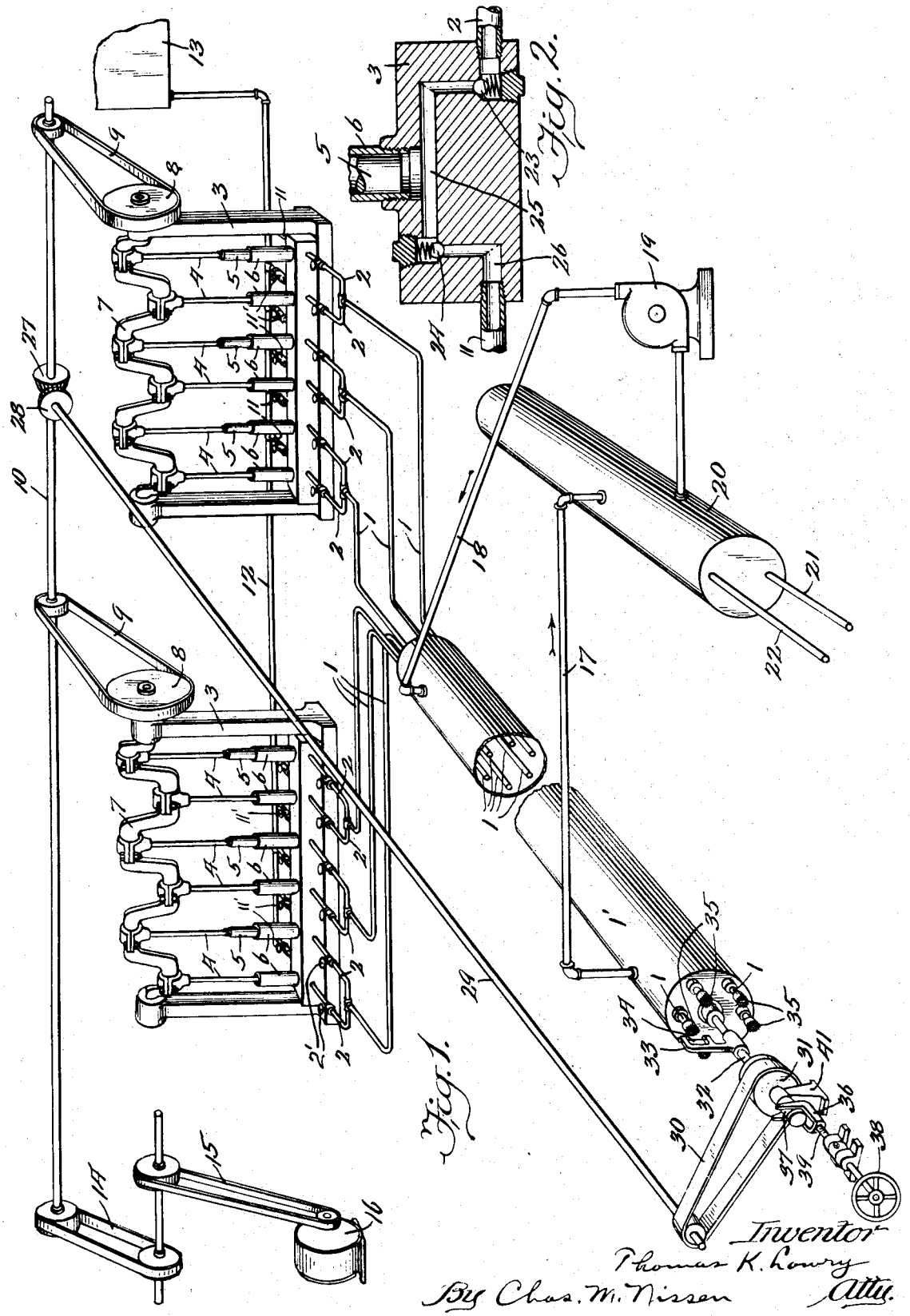

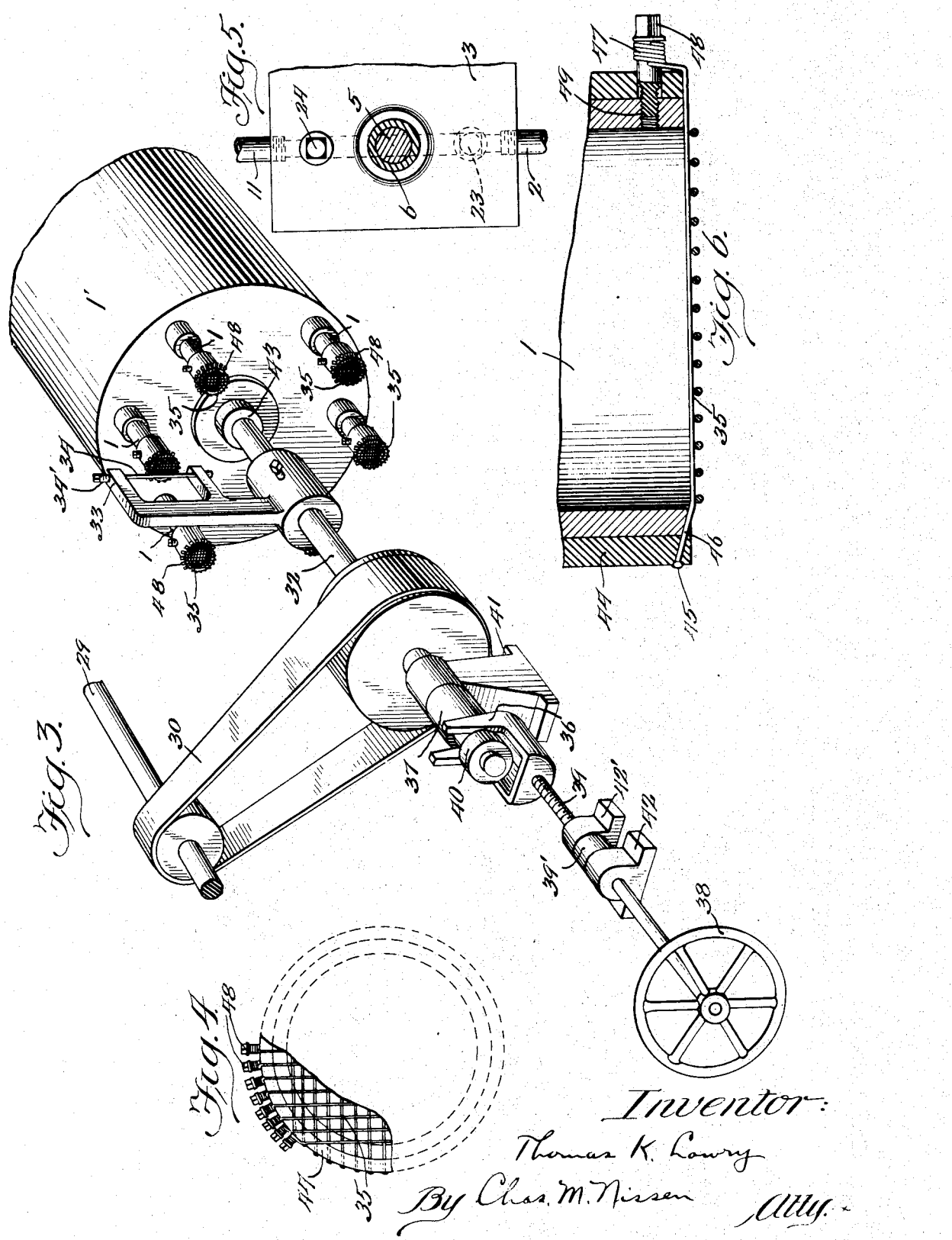

1,906,694

UNITED STATES PATENT OFFICE

THOMAS K. LOWRY, OF CHICAGO, ILLINOIS, ASSIGNOR TO DARLING & COMPANY, A CORPORATION OF ILLINOIS

METHOD AND APPARATUS FOR MANUFACTURING PELLET GLUE

Application filed March 22, 1929. Serial No. 349,032.

The present invention relates to machines for manufacturing glue and has for one of its objects the provision of means for jelling the glue and forming the same into small particles or pellets so that the glue will dry more quickly than it would if formed into a slab or strip as is usually done.

Another object of this invention is the provision of means for insuring a uniform flow of glue through the various units of the apparatus so that the product obtained is more uniform, since in devices of this nature, consistency of the jelled glue depends largely upon the rate of flow of the substance through the apparatus.

In the drawings:—

Fig. 1 is a perspective view showing diagrammatically one form of device embodying my invention;

Fig. 2 is a sectional view through one of the pumps;

Fig. 3 is an enlarged view of part of the apparatus shown in Fig. 1;

Fig. 4 is a view showing the arrangement of the wires at the ends of certain tubular members shown in Figs. 1 and 3;

Fig. 5 is a plan view of that portion of the pump shown in Fig. 2; and

Fig. 6 is a cross section of the device shown in Fig. 4.

The illustrated embodiment of my invention shows a plurality of pipes 1 arranged within the cooling tank 1' and having their opposite ends protruding through the ends of the tank. One end of each of the pipes 1 is connected to two of the branch pipes 2 leading into their respective cylinders 6 forming a part of the member 3. Within each of the cylinders 6 is a piston 5 adapted to reciprocate therein and these are connected by means of the connecting rods 4 to the crank 7 which, in turn, is driven by the pulley 8 connected to the drive shaft 10 by means of the belt 9. The drive shaft 10 is driven by a variable speed motor 16 and suitable belts 14 and 15, as illustrated. However, it is understood that any other means may be used to drive the shaft 10, if desired.

Each of the pipes 1 is adapted to receive liquid or semi-liquid glue from the branch pipes 2, each of the latter being supplied by one of the pumps comprising a piston 5 and its respective cylinder 6. Glue in liquid form is stored in the tank 13 and is supplied to each of the pumps by means of a conduit 12 and branch conduits 11, each of the latter being connected to but one pump and having a valve 11' therein for shutting off the supply of glue to the pumps. The pipes 2 also each have a valve 2' therein and by closing the valves 11' and 2' leading to and from one of said pumps, that pump may be cut out of the circuit for repairs or the like. When valves 11' and 2' are closed the plug over the valve 24 or that over the valve 23 may be removed to prevent resistance to the movement of the piston of the inoperative pump or pumps.

As best illustrated in Fig. 2, each pump has the lower end of the cylinder opening into a passage 25 in the member 3 and this passage at one end communicates with a second passage 26 into which the branch conduit 11 is screw-threaded. The opposite end of the passage 25 communicates with one of the branch conduits 2. Valves 23 and 24 are arranged at opposite ends of the conduit 25 to normally close the ends of this passage. These valves are spring pressed into engagement with their seats but as the piston 5 is drawn upward, the valve 24 opens due to the suction created and draws the glue through the pipe 11 into the passage 25 and cylinder 6. As the piston descends, the valve 24 closes and the valve 23 opens, thus forcing the glue into the branch conduit 2 connected to a single pipe 1. Glue is forced alternately through each pair of conduits 2 so that a substantially uniform flow of glue is obtained through each of the pipes 1 communicating with these branches. The same effect might be obtained by using a double acting pump with a branch conduit such as 2 leading from each end of the pump cylinder.

The tank 1' contains a cooling medium such as brine, and a suitable circulating system is provided for the brine so that the same may always be kept at the desired temperature in the tank 1. This circulating system comprises a tank 20, connected by means of a conduit 17 to the tank 1' and also is connected thereto by means of the pipe 18 and pump 19. The brine is pumped from the tank 20 into the tank 1 through the conduit 18 and returns to the tank 20 by means of the conduit 17. While the brine is in the tank 20, it is cooled by suitable refrigerating apparatus therein, connected to the pipes 21 and 22 which carry ammonia, or other refrigerant, to said refrigerating apparatus in a manner which is well-known. Any suitable form of cooling medium may be used in the tank 1' and it has been found that cold lake water may be used very effectively, especially with high grade glues which jell at higher temperatures than the lower grades. Suitable baffles may be used to circulate the brine in the tank 1'.

The brine solution, or other cooling medium, with which it may be desired to fill the tank 1', cools the glue as it passes through the pipes 1 so that as it emerges from the forward ends of the pipes, as seen in Fig. 1 or Fig. 3, it will be in a semi-solid state. This makes it suitable for cutting into strips or pellets, as may be desired. In the device illustrated, the glue, as it emerges from the end of each of the pipes 1, passes through a mesh 35 formed of piano wire. Each mesh is preferably formed as illustrated and in this form comprises a plurality of piano wires each having an end 46 thereof passing through an opening in a collar 44 surrounding the end of the pipe on which it is mounted and is restrained from moving through said opening in one direction by means of the bead 45 formed on one end thereof. The opposite end of each of the wires 45 is fastened to a member 48 which is rotatably mounted in the collar 44 and screw-threaded into the respective pipe 1 so that as the member 48 is rotated, the wire is wound thereon to stretch the wire tightly over the opening at the end of the pipe. The wires are all arranged at right angles to each other but this is not necessary as the device will operate with the wires at other angles thereto.

A shaft 32 is rotatably mounted in bearings 41 and 43 and carries the members 33 having forked arms thereon between which a wire 34 is adapted to be stretched, a screw 34' being provided to tension said wire. The shaft 32 is driven by a belt 30 from a shaft 29 which in turn is driven by the shaft 10 through the bevel gears 27 and 28. As the shaft rotates, the wire 34 is carried past the ends of the pipes 1 to cut the strips of glue which pass through the meshes 35.

Since the most advantageous cutting will occur when the wire 34 is arranged so that it passes quite close to the meshes, the wire is ordinarily adjusted to this position. To make this adjustment, the shaft 32 is provided at one end with a collar 40 and a collar 37. A forked arm 36 is adapted to have the forked extensions thereof extend into the recess between the two collars 37 and 40 and on opposite sides of the shaft 32, and is provided with a screw-threaded opening for receiving the screw 39 rotatably mounted in the bearings 42 and 42' but prevented from longitudinal displacement with respect to said bearings by means of the collar 39' fixed to the shaft. The screw 39 has a hand wheel 38 rigidly mounted on one end thereof and rotation of this hand wheel causes the forked member 36 and, consequently, the shaft 32, to move in a longitudinal direction and in a direction toward or away from the meshes 35 depending upon the direction in which the hand wheel is turned.

The operation of the device is as follows:
Liquid glue in the tank 13 passes through the pipe 12 into the pumps where it is pumped into the pipes 1 through the branch pipes 2. As the glue passes through the tank 1', it is cooled to such a consistency as will make it suitable for cutting and as it reaches the ends of the pipes 1, the meshes 35 cut the glue emerging from each pipe into a plurality of strips which are, in turn, cut into desirable lengths by means of the wire 34 which successively engages the strips of glue emerging from the pipes 1. It is preferable to have the member 33 rotating at such a speed relative to the speed of reciprocation of the pumps so that the wire 34 will cut very short strips of glue as it passes the meshes.

Preferably, the glue is cut in such lengths as to make each separate piece thereof of substantially the same dimension in all directions. In other words, the pieces of glue would be substantially cubical in form which gives to each piece of glue a greater surface area per unit volume of glue than would be obtained by cutting the glue into longer strips. Therefore, the glue in this form will dry quicker than glue in longer lengths since the rate of drying is a function of ratio of the surface area of the glue to the unit volume thereof. Due to the use of the fine piano wires, the glue is cut without materially affecting the consistency or the form of the glue as it emerges from the end of the pipe. Ordinarily, if glue is forced through outlet openings wherein the glue must be compressed or distorted to any great extent, it will have a tendency to change to a granular form rather than remain in the solid or more compact form which results from the use of this device. It has been found that the glue will not change to a granular form as long as the cross sectional area of the conduit in the cooling tank is not materially reduced or increased. For this reason, it has been found practical to change the shape of a tube which is round throughout the major portion thereof so that it is square at the end as long as the cross sectional area of the square portion is substantially equal to the cross sectional area of the round portion. By having the tube square at the end the pellets cut therefrom are more uniform in size and shape.

After the glue has been cut in the manner described, it is deposited upon a suitable conveyer (not shown) by means of which it is transferred to dryers.

The present invention is not limited to the formation of pellets of glue but may be used in forming other materials into strips of desired length or in materials in which it is necessary to change them from a liquid to a gelatinous semi-solid or solid state by cooling or heating. Thus, the apparatus described could be used in chilling lard, oleomargarine, oleostearine, stearic acid, candy and also can be used in the manufacture of ice cream. If it is necessary to heat the substance before it is cut, the tank 1' may be used as a heating tank instead of a chilling tank, and heat may be supplied thereto by any suitable means such as steam or hot water.

In chilling certain substances, it might be found desirable to change the velocity of flow through pipes 1 by increasing or decreasing the area of the pipe at certain points so as to produce a mixing of the ingredients in said substance or for some similar purpose.

If desired, cone pulleys may be used in place of each of the two pulleys upon which the belt 30 is mounted to form a means for varying the speed of rotation of shaft 32 relative to the strokes of the pumps 5.

Obviously, those skilled in the art may make various changes in the details and arrangement of parts without departing from the spirit and scope of the invention as defined by the claims hereto appended, and I therefore do not wish to be restricted to the precise construction herein disclosed.

Having thus fully disclosed an embodiment of my invention, what I claim and desire to secure by Letters Patent of the United States is:—

1. The process of jellifying glue which comprises the steps of urging liquid glue continuously into a passage by means independently controlling the flow into and through said passage, and conditioning the glue as it flows through said passage to jellify the same before it emerges therefrom whereby to effect a uniform flow of glue in a proper jellified state at the outlet of said passage.

2. The process of jellifying glue which comprises urging liquid glue continuously into a plurality of passages by means independently controlling the flow through each of said passages, conditioning the glue as it flows through said passages to jellify the same before it emerges therefrom whereby to effect a uniform flow of glue in a proper jellified state at the outlet of said passages, and thereafter forming said jellified glue into pellets.

3. The process of jellifying glue which comprises the steps of urging liquid glue continuously into a passage which is substantially uniform in cross-sectional area throughout that portion of the exit end thereof in which the glue is in a jellified state by a means independently controlling the flow into and through said passage, and conditioning the glue as it flows through said passage to jellify the same before it emerges therefrom whereby to effect a uniform flow of glue in a proper jellified state at the outlet of said passage and the structure of the jellified glue remains substantially intact.

4. The process of jellifying glue which comprises urging liquid glue in measured unvarying quantities at a predetermined rate through a passage by a means independently controlling the flow into and through said passage, and conditioning the glue as it flows through said passage to jellify the same before it emerges from the passage whereby to effect a uniform flow of glue in a proper jellified state at the outlet of said passage.

5. Apparatus for forming glue pellets comprising a plurality of pipes, a cooling chamber in which said pipes are arranged, means for independently controlling the flow through each pipe and for urging glue continuously therethrough, and means for supplying a cooling medium to said cooling chamber whereby said glue is jellified as it passes from one end of each of said pipes to the other.

6. Apparatus for the manufacture of pellets comprising a tank having a plurality of pipes mounted therein, a plurality of pumping units each of which supplies only one of said pipes with no pipe supplied by more than one pump, said pumping units being so arranged whereby each may be controlled independently of the other pumping units, a grating at the exit end of each of said pipes opposite to that end which is connected to a pumping unit, means for supplying a cooling medium to said tank to effect jellifying of the glue, and a movable cutting member mounted for movement past said last mentioned ends of said pipes to comminute the glue as it emerges therefrom.

7. Apparatus for reducing glue to a jellified state comprising a conduit, means for conditioning said glue as it passes through said conduit whereby said glue is changed from a liquid into a jellified state and emerges therefrom while in the latter state, said conduit being substantially uniform in cross-sectional area throughout the entire length of that portion thereof in which the glue is in a jellified state, and means controlling only said conduit for forcing the glue in a continuous uninterrupted stream therethrough.

8. Apparatus for manufacturing glue comprising a plurality of tubular members, a cooling chamber surrounding said members, a plurality of pumps, means for connecting each of said tubular members with a different pump, and each of the pumps connected with said tubular members being adapted to supply only the one tubular member with which it is connected whereby said pumps deliver measured quantities of glue at a predetermined rate to each of said tubular members, means for connecting said pumps to a source of liquid glue supply, means for actuating said pumps to force the liquid glue into said tubular members, means for jellifying said glue during its travel from one end of each of the tubular members to the other end thereof, and means for cutting said glue after it has been jellified.

9. Apparatus for the manufacture of glue comprising a plurality of tubular members, a cooling chamber surrounding said members, means for supplying said chamber with a cooling medium, a plurality of pumps, means for connecting each of said pumps to different ones of said tubular members whereby each tubular member is supplied by only one pump, means for actuating said pumps, means connecting said pumps with a source of liquid glue supply, said pumps being adapted to pump said liquid glue from said source of supply to and through said tubular members, said glue during its travel from one end of each of said tubular members to the other end thereof becoming jellified due to the action of said cooling medium, and means for cutting said glue transversely after it has been jellified, comprising a single cutting member arranged to move past the ends of all of said tubes through the jellified glue as it emerges therefrom.

In testimony whereof I have signed my name to this specification on this 20th day of March, A. D. 1929.

THOMAS K. LOWRY.